(12) United States Patent
Mizuno et al.

(10) Patent No.: US 9,303,554 B2
(45) Date of Patent: Apr. 5, 2016

(54) POWER-ASSISTED SUPERCHARGER AND METHOD FOR CONTROLLING SAME

(75) Inventors: Yuichiro Mizuno, Tokyo (JP); Kazuhiko Shinagawa, Tokyo (JP)

(73) Assignee: IHI CORPORATION (JP)

( * ) Notice: Subject to any disclaimer, the term of this patent is extended or adjusted under 35 U.S.C. 154(b) by 16 days.

(21) Appl. No.: 14/007,042

(22) PCT Filed: Apr. 6, 2012

(86) PCT No.: PCT/JP2012/059512
§ 371 (c)(1),
(2), (4) Date: Sep. 24, 2013

(87) PCT Pub. No.: WO2012/137921
PCT Pub. Date: Oct. 11, 2012

(65) Prior Publication Data
US 2014/0013742 A1    Jan. 16, 2014

(30) Foreign Application Priority Data

Apr. 8, 2011   (JP) ................. 2011-086204

(51) Int. Cl.
| | |
|---|---|
| *F02D 23/00* | (2006.01) |
| *F02B 33/44* | (2006.01) |
| *F02B 37/04* | (2006.01) |
| *F02B 37/10* | (2006.01) |
| *F02B 37/12* | (2006.01) |
| *F02B 39/10* | (2006.01) |
| *F02B 37/14* | (2006.01) |

(Continued)

(52) U.S. Cl.
CPC ............. *F02B 37/04* (2013.01); *F02B 37/10* (2013.01); *F02B 37/12* (2013.01); *F02B 37/14* (2013.01);

(Continued)

(58) Field of Classification Search
CPC .......... F02B 37/04; F02B 37/10; F02B 37/12; F02B 37/14; F02B 39/10; F02D 23/00; F02D 41/0007; F02D 41/045; F02D 41/10; Y02T 10/144

USPC ............................ 60/602, 603, 607
See application file for complete search history.

(56) References Cited

U.S. PATENT DOCUMENTS

| 2004/0061290 A1* | 4/2004 | Gray, Jr. ................. 277/411 |
| 2010/0287932 A1 | 11/2010 | Tanaka et al. .............. 60/602 |

FOREIGN PATENT DOCUMENTS

| CN | 1930386 A | 3/2007 |
| EP | WO 2005/028833 A2 | 3/2005 |

(Continued)

OTHER PUBLICATIONS

Korean Office Action, dated Aug. 21, 2014, issued in Korean Patent Application No. 10-2013-7025452. English translation. Total 8 pages.

(Continued)

*Primary Examiner* — Kenneth Bomberg
*Assistant Examiner* — Dapinder Singh
(74) *Attorney, Agent, or Firm* — Ostrolenk Faber LLP (57) ABSTRACT

The power-assisted supercharger (10) includes: a turbocharger (12) in which a turbine (12a) is rotationally driven by exhaust gas (7) from an engine (40), a compressor (12b) rotationally driven by the turbine compresses intake air (5) and supplies the intake air to the engine; an electric motor (14) connected to a rotary shaft (12c) connecting the turbine and the compressor, the electric motor to add rotational force to the turbocharger; and a motor controller (20) to control a drive current (I) to the electric motor required for an assist operation for the turbocharger, by open loop, based on an accelerator opening degree (A) of the engine and a rotational speed (NE) of the engine. In this power-assisted supercharger, a turbo lag can be reduced by itself, power consumption can be small even in a range in which the rotational speed is high, malfunctions or unnecessary power consumption can be prevented, a control system can be simplified, and the installation space and the weight thereof can be small.

5 Claims, 8 Drawing Sheets (51) Int. Cl.
- *F02D 41/04* (2006.01)
- *F02D 41/10* (2006.01)
- *F02D 41/00* (2006.01)
- *F02D 41/14* (2006.01)

(52) U.S. Cl.
CPC ............... *F02B 39/10* (2013.01); *F02D 23/00* (2013.01); *F02D 41/0007* (2013.01); *F02D 41/045* (2013.01); *F02D 41/10* (2013.01); *F02D 2041/1432* (2013.01); *F02D 2200/101* (2013.01); *F02D 2200/602* (2013.01); *Y02T 10/144* (2013.01)

(56) References Cited

FOREIGN PATENT DOCUMENTS

| | | |
|---|---|---|
| JP | 01-117933 | 5/1989 |
| JP | 11-280510 | 10/1999 |
| JP | 2003-239754 | 8/2003 |
| JP | 2007-132288 | 5/2007 |
| JP | 2008-196323 | 8/2008 |
| JP | 2010-190143 | 9/2010 |
| JP | 2011-032990 | 2/2011 |

OTHER PUBLICATIONS

Search Report dated Aug. 7, 2014 issued in corresponding European Patent Application No. 12767597.3.

International Search Report and Written Opinion mailed Jul. 10, 2012 in corresponding PCT International Application No. PCT/JP2012/059512.

Office Action dated Apr. 1, 2015 issued in corresponding Chinese Patent Application No. 201280016565.8 with English translation of Search Report only.

* cited by examiner

POWER-ASSISTED SUPERCHARGER AND METHOD FOR CONTROLLING SAME

CROSS-REFERENCE TO RELATED APPLICATIONS

The present application is a 35 U.S.C. §§371 national phase conversion of PCT/JP2012/059512, filed Apr. 6, 2012, which claims priority to Japanese Patent Application No. 2011-086204, filed Apr. 8, 2011, the contents of which are incorporated herein by reference. The PCT International Application was published in the Japanese language.

TECHNICAL FIELD

The present invention relates to a supercharger, and in more detail, relates to a power-assisted supercharger and a method for controlling the supercharger.

BACKGROUND ART

A supercharger is an apparatus to increase the intake pressure of an internal combustion engine (hereinafter referred to as "engine"), and to improve the filling efficiency thereof. Conventionally, in a case where torque required of the engine is great, supercharging is performed using the supercharger and thereby the torque generated by the engine is increased.

Superchargers are roughly classified into a turbocharger to be driven by the exhaust gas from the engine, and a mechanical-driven supercharger to be driven by the engine or an electric motor.

In addition, a power-assisted supercharger drives a rotary shaft of the turbocharger by using an electric motor, in order to enhance (assist) the torque or the rotational speed of the turbocharger. This power-assisted supercharger is disclosed in, for example, Patent Documents 1 to 3.

Conventionally, in order to determine drive requests to the electric motor of the power-assisted supercharger, the acceleration intention of the driver thereof is detected from the amount of movement of an accelerator pedal or the like, a target value of a boost pressure or a turbine rotational speed is calculated, a difference between the target value and an actual value of the boost pressure or the turbine rotational speed is detected, and feedback control is performed using the difference.

DOCUMENT OF RELATED ART

Patent Document

[Patent Document 1] Japanese Unexamined Patent Application, First Publication No. 2007-132288
[Patent Document 2] Japanese Unexamined Patent Application, First Publication No. 2008-196323
[Patent Document 3] Japanese Unexamined Patent Application, First Publication No. 2010-190143

SUMMARY OF INVENTION

Technical Problem

When the supercharging is performed using the turbocharger, (1) in a case where engine output is small in starting the supercharging, (2) in a case where a turbine shaft is stopped in starting the supercharging, or (3) in a case where the turbine rotational speed is low, the output generated by a turbine is small. Therefore, it will take a few seconds before the turbine rotational speed reaches the enough rotational speed to perform the supercharging, and during the few seconds, the supercharger cannot perform the supercharging sufficiently (generally, this supercharging lag is referred to as "turbo lag").

In a case where the mechanical-driven supercharger is used, the amount of air proportionate to an engine rotational speed can be supercharged, and thereby the turbo lag is not produced. However, drive force required by the mechanical-driven supercharger is great in a range in which the engine rotational speed is high, so that the crank shaft drive force of the engine is consumed. Therefore, the axle shaft output is small and the fuel consumption deteriorates.

In addition, there is a supercharging system in which the turbocharger and the mechanical-driven supercharger are combined together using a clutch and a bypass flow path. In this supercharging system, these superchargers supplement each other demerit. However, since two superchargers having different operating principles are provided, the system becomes complicated, and the installation spaces or the weights of the superchargers are increased. Therefore, the system is contrary to the purpose of obtaining great torque with a small and lightweight engine.

On the other hand, in the power-assisted supercharger, the opening degree of the accelerator pedal is generally used to detect the acceleration intention of the driver. However, even when a vehicle is running at a constant speed without acceleration, the opening degree of the accelerator pedal becomes a value in a wide range, depending on the driving conditions of the vehicle. In addition, even when the vehicle is running at a constant speed, the opening degree of the accelerator pedal is changed, depending on the skill or personal habits of the driver.

As a result, in order to prevent malfunctions or unnecessary power consumption, a dead zone has to be provided with respect to the opening degree of the accelerator pedal. Therefore, when the opening degree of the accelerator pedal is small, a great target value cannot be set for the assist value of the electric motor. Consequently, it will take times before the assist by the electric motor is started, and the turbo lag cannot be removed efficiently.

In a case where the control thereon is performed using feedback control, a sensor is required in order to detect the difference from the target value, a high-speed arithmetic unit is required in order to compute the difference quickly, and the control system may become complex.

In addition, even though there is no problem with the operation of the feedback loop, if the setting or calculation of the target value of the boost pressure or the turbine rotational speed is incomplete, the removal of the turbo lag may become insufficient, and great electric power may continue to be applied thereto for a long period of time, so that electric power may be wasted. As a result, the fuel consumption of the vehicle may deteriorate.

The present invention has been made in order to solve the above-described problems. That is, the present invention aims to provide a power-assisted supercharger and a method of controlling the supercharger, in which the turbo lag can be reduced by itself, the power consumption is small even in a range in which the engine rotational speed is high, malfunctions or unnecessary power consumption can be prevented by providing a dead zone with respect to the opening degree of an accelerator pedal, a sensor and a high-speed arithmetic unit required for feedback control can be omitted, the control system can be simplified, and the installation space and the weight thereof can be small.

Solution to Problem

A power-assisted supercharger relating to the present invention includes: a turbocharger in which a turbine is rotationally driven by exhaust gas from an engine, a compressor rotationally driven by the turbine compresses intake air and supplies the intake air to the engine; an electric motor connected to a rotary shaft connecting the turbine and the compressor, the electric motor to add rotational force to the turbocharger; and a motor controller to control a drive current to the electric motor required for an assist operation for the turbocharger, by open loop, based on an accelerator opening degree of the engine and a rotational speed of the engine.

In the present invention, a method for controlling a power-assisted supercharger which includes: a turbocharger in which a turbine is rotationally driven by exhaust gas from an engine, a compressor rotationally driven by the turbine compresses intake air and supplies the intake air to the engine; and an electric motor connected to a rotary shaft connecting the turbine and the compressor, the electric motor to add rotational force to the turbocharger, the method includes a step of controlling a drive current to the electric motor required for an assist operation for the turbocharger, by open loop, based on an accelerator opening degree of the engine and the rotational speed of the engine.

Effects of Invention

According to the power-assisted supercharger and the method of controlling the supercharger in the present invention described above, since the electric motor is provided in order to add rotational force to the turbocharger, the electric motor can enhance the rotational speed of the turbocharger, whereby the boost pressure of the engine can be increased quickly, and the torque of the engine can also increase quickly.

Thereby, the responsiveness of engine torque is improved, the turbo lag can be reduced, and the power consumption can become small even in a range in which the engine rotational speed is high. Therefore, the upshift timing in running by the automatic transmission can be hastened (down-speeding), and the amount of exhaust gas from the engine can be decreased (downsizing). As a result, the amount of $CO_2$ emission can be reduced while the vehicle is running.

In addition, the motor controller is provided, and controls the drive current to the electric motor required for the assist operation for the turbocharger, from the accelerator opening degree change rate of the engine. Therefore, malfunctions or unnecessary power consumption can be prevented by providing a dead zone with respect to the accelerator opening degree, and the turbo lag can also become small.

Furthermore, since the drive current to the electric motor is controlled by open loop, a sensor and a high-speed arithmetic unit required for feedback control can be omitted, the control system can be simplified, and the above effects can be obtained in a lightweight device and at a low cost.

DESCRIPTION OF EMBODIMENTS

Embodiments in the present invention are described below with reference to the drawings. The same components in the drawings are denoted by the same reference sign, and a duplicate description is omitted here.

Figure 1:
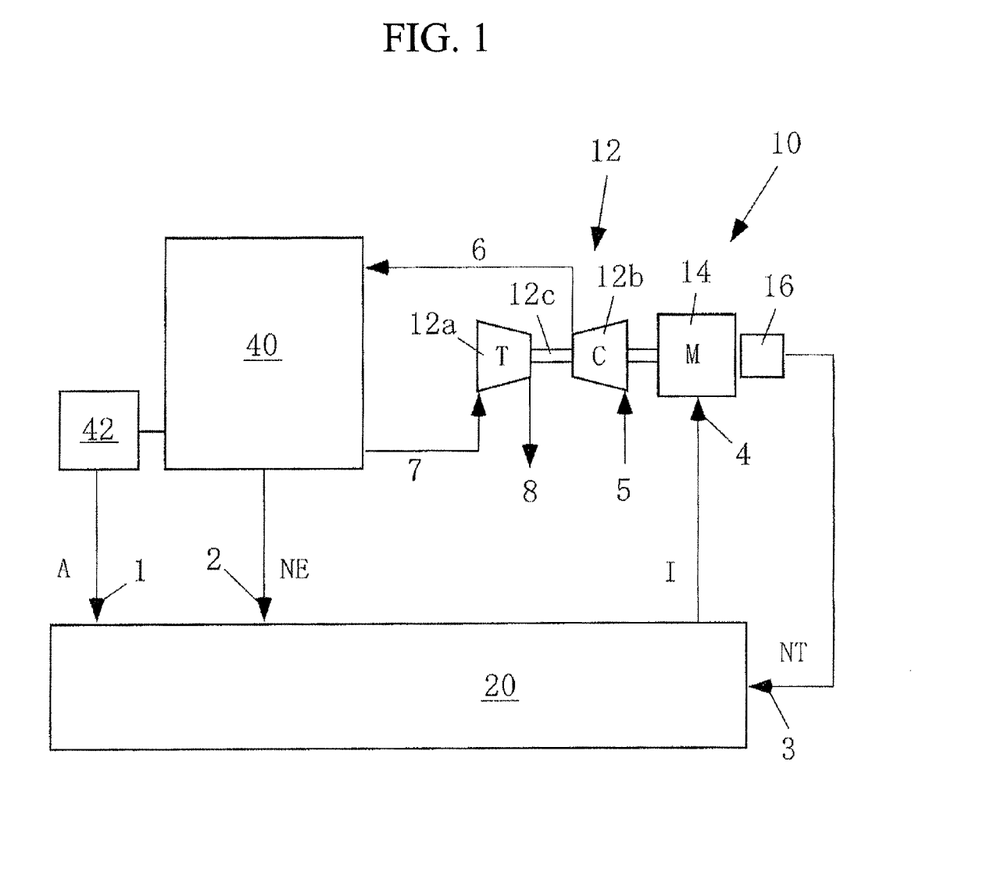
FIG. 1 is a diagram showing the entire configuration of an engine including a power-assisted supercharger.

FIG. 1 is a diagram showing the entire configuration of an engine including a power-assisted supercharger in the present invention. A power-assisted supercharger 10 in the present invention includes a turbocharger 12, an electric motor 14, and a motor controller 20.

In this diagram, a reference sign 40 denotes an engine (internal combustion engine), and a reference sign 42 denotes an accelerator of the engine. The engine 40 is controlled by an engine controller (not shown), and outputs engine rotational speed signals 2 to the motor controller 20. The accelerator 42 is operated by an operator (for example, a driver of a vehicle), and outputs accelerator opening degree signals 1 of the engine, to the motor controller 20 and the engine controller (not shown).

The turbocharger 12 includes a turbine 12a, a compressor 12b, and a rotary shaft 12c. The turbine 12a is rotationally driven by exhaust gas 7 from the engine 40, the compressor 12b rotationally driven by the turbine 12a compresses intake air (air 5), and compressed air 6 is supplied to the engine 40. A reference sign 8 denotes exhaust gas released to the outside of the vehicle. In addition, in this example, the rotary shaft 12c directly connects the turbine 12a and the compressor 12b, but may indirectly connect them through gears or the like.

The electric motor 14 is connected to the rotary shaft 12c connecting the turbine 12a and the compressor 12b, adds rotational force to the turbocharger 12, and performs an assist operation for the turbocharger 12.

In comparison with the normal operation of the turbocharger 12 by the exhaust gas 7, the "assist operation" means that the electric motor 14 adds rotational force to the turbocharger 12, and accelerates the turbocharger 12. Consequently, when the electric motor 14 does not perform the assist operation, that is, when the drive current I of the electric motor 14 is 0, the drive torque of the electric motor 14 is 0, and the turbocharger 12 autonomously operates by itself.

In FIG. 1, a reference sign 16 denotes a rotational speed sensor of the turbocharger 12, and the rotational speed sensor outputs rotational speed signals 3 of the turbocharger 12, to the motor controller 20. The rotational speed sensor 16 detects the rotational speed of the electric motor 14 in this diagram, but may detect the rotational speed of the rotary shaft 12c. In a case where the turbine 12a and the compressor 12b are indirectly connected through gears or the like, the rotational speed sensor 16 may detect the rotational speed of one of the turbine 12a and the compressor 12b.

The motor controller 20 receives the accelerator opening degree signals 1, the engine rotational speed signals 2, and the rotational speed signals 3 of the turbocharger. The motor controller 20 outputs drive signals 4 to the electric motor 14, and controls the drive current I of the electric motor 14 by open loop. The drive current I to the electric motor 14 is an electric current required for the assist operation for the turbocharger 12.

Hereinafter, an accelerator opening degree is denoted by a reference sign A, an engine rotational speed is denoted by a reference sign NE, and the rotational speed of the turbocharger (hereinafter referred to as "turbocharger rotational speed") is denoted by a reference sign NT.

Figure 2:
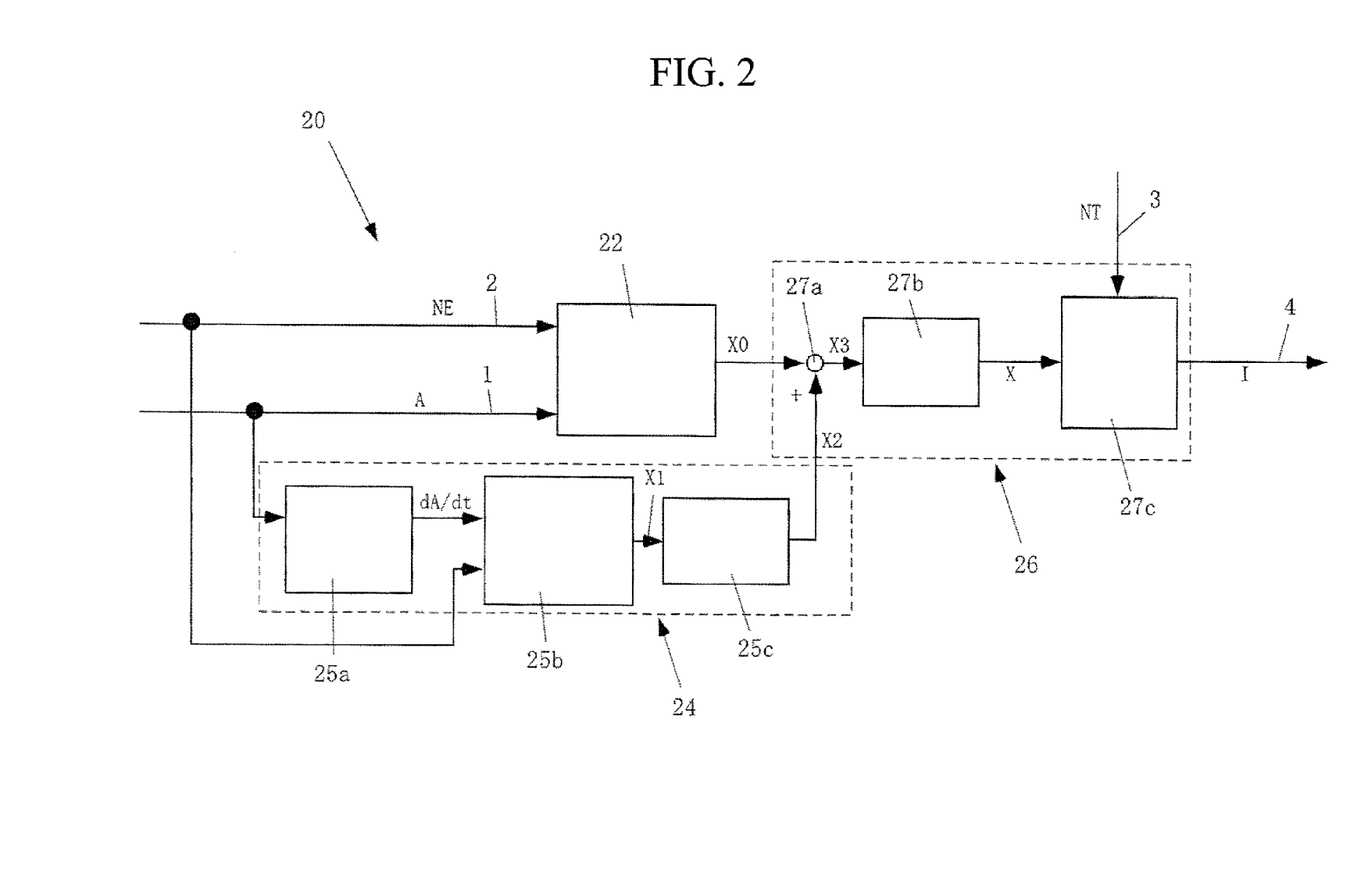
FIG. 2 is a diagram showing a first embodiment of a motor controller.
Figure 3:
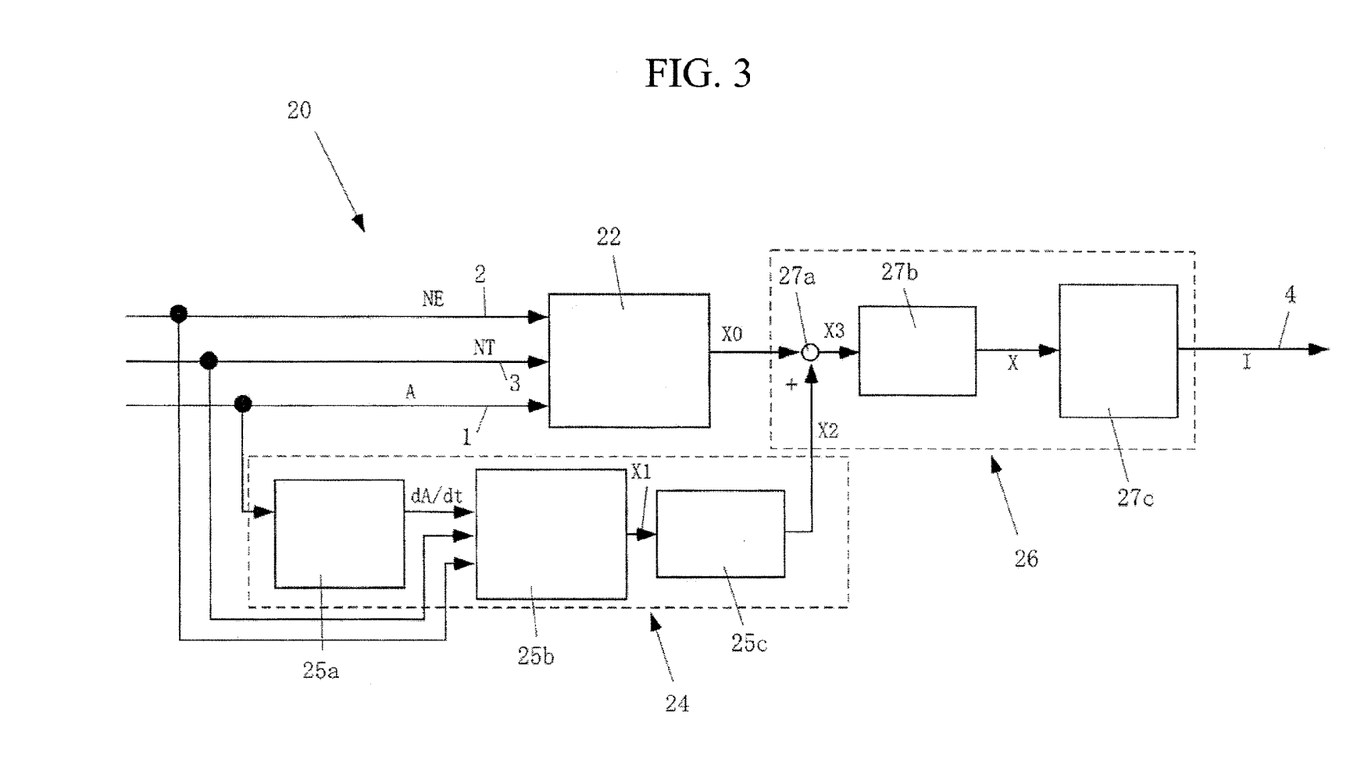
FIG. 3 is a diagram showing a second embodiment of the motor controller.

FIG. 2 is a diagram showing a first embodiment of the motor controller. FIG. 3 is a diagram showing a second embodiment of the motor controller. In FIGS. 2 and 3, the motor controller 20 in these embodiments includes a steady instruction value arithmetic unit 22, an acceleration instruction value arithmetic unit 24, and a drive current arithmetic unit 26.

The steady instruction value arithmetic unit 22 calculates a steady instruction value X0 required for the steady operation of the turbocharger 12 in the accelerator opening degree A, from the accelerator opening degree A of the engine. The steady instruction value X0 is a torque instruction value or a speed instruction value to the electric motor 14.

In FIG. 2, the steady instruction value X0 is the torque instruction value to the electric motor 14. The steady instruction value arithmetic unit 22 outputs the steady instruction value X0 as the torque instruction value of the electric motor 14, from the accelerator opening degree A and the engine rotational speed NE.

In FIG. 3, the steady instruction value X0 is a rotational speed instruction value to the electric motor 14. The steady instruction value arithmetic unit 22 outputs the steady instruction value X0 as the rotational speed instruction value of the electric motor 14, from the accelerator opening degree A, the engine rotational speed NE, and the turbocharger rotational speed NT.

The acceleration instruction value arithmetic unit 24 calculates an acceleration instruction value X2 required for the acceleration operation of the turbocharger 12, from a change rate dA/dt (hereinafter referred to as "accelerator opening degree change rate") of the accelerator opening degree A of the engine. The acceleration instruction value X2 is a torque instruction value or a speed instruction value to the electric motor 14.

In FIG. 2, the acceleration instruction value X2 is the torque instruction value to the electric motor 14. The acceleration instruction value arithmetic unit 24 outputs the acceleration instruction value X2 as the torque instruction value of the electric motor 14, from the accelerator opening degree A and the engine rotational speed NE.

In FIG. 3, the acceleration instruction value X2 is a rotational speed instruction value to the electric motor 14. The acceleration instruction value arithmetic unit 24 outputs the acceleration instruction value X2 as the rotational speed instruction value of the electric motor 14, from the accelerator opening degree A, the engine rotational speed NE, and the turbocharger rotational speed NT.

In FIGS. 2 and 3, the acceleration instruction value arithmetic unit 24 includes an accelerator opening degree change rate arithmetic device 25a, an acceleration instruction value arithmetic device 25b, and a filter 25c.

The accelerator opening degree change rate arithmetic device 25a calculates the change rate dA/dt (accelerator opening degree change rate dA/dt) of the accelerator opening degree A.

The acceleration instruction value arithmetic device 25b calculates the torque instruction value or the speed instruction value to the electric motor 14 required for the acceleration operation of the turbocharger 12, as an acceleration instruction value X1, based on the accelerator opening degree change rate dA/dt.

It is preferable that the acceleration instruction value X1 be set to a sufficiently greater value than the above steady instruction value X0, for example, to a greater value than the upper limit of a limiter 27b.

The filter 25c filters the acceleration instruction value X1, and outputs the filtered acceleration instruction value X1 as the acceleration instruction value X2. This filter 25c has the characteristic of generating a time delay when the acceleration instruction value X1 decreases. The filter 25c is, for example, a primary delay filter or a moving average filter. This time delay is set so as to maintain the acceleration instruction value X1 calculated from the accelerator opening degree change rate dA/dt.

The drive current arithmetic unit 26 calculates the drive current I of the electric motor 14 from the steady instruction value X0 and the acceleration instruction value X2, and outputs it.

In FIGS. 2 and 3, the drive current arithmetic unit 26 includes an adder 27a, the limiter 27b, and a motor driver 27c.

The adder 27a calculates a combined instruction value X3 by adding the steady instruction value X0 and the acceleration instruction value X2.

The limiter 27b generates an output instruction value X by limiting the combined instruction value X3 to the upper limit thereof or less. This upper limit is set depending on the characteristic of the electric motor 14.

The motor driver 27c calculates the drive current I of the electric motor 14 based on the output instruction value X, and outputs it.

If the output instruction value X is the torque instruction value, the drive current I of the electric motor 14 is calculated from the torque instruction value and the turbocharger rotational speed NT. If the output instruction value X is the speed instruction value, the drive current I of the electric motor 14 is calculated from the difference between the speed instruction value and the turbocharger rotational speed NT.

In FIG. 2, the acceleration instruction value X1, the acceleration instruction value X2, the combined instruction value X3, and the output instruction value X are torque instruction values to the electric motor 14. The motor driver 27c calculates the drive current I of the electric motor 14 from the output instruction value X and the turbocharger rotational speed NT, and outputs it.

In FIG. 3, the acceleration instruction value X1, the acceleration instruction value X2, the combined instruction value X3, and the output instruction value X are rotational speed instruction values to the electric motor 14. The motor driver 27c calculates the drive current I of the electric motor 14 from the output instruction value X, and outputs it.

In the method of the present invention using the power-assisted supercharger 10 shown in FIGS. 1 to 3, the drive current I of the electric motor 14 required for the assist operation for the turbocharger 12 is controlled using the change rate dA/dt of the accelerator opening degree A of the engine, by open loop.

That is, (A) the above steady instruction value arithmetic unit 22 calculates the steady instruction value X0 required for the steady operation of the turbocharger 12 in the accelerator opening degree A, from the accelerator opening degree A of the engine.

In addition, (B) the above acceleration instruction value arithmetic unit 24 calculates the acceleration instruction value X2 required for the acceleration operation of the turbocharger 12, from the change rate dA/dt (accelerator opening degree change rate) of the accelerator opening degree A of the engine. This calculation is performed parallel to the calculation in (A). In this calculation, the sequence of the acceleration instruction value calculation and the filtering process may be different from the above-described example.

Subsequently, (C) the above drive current arithmetic unit 26 calculates the drive current I of the electric motor 14 from the steady instruction value X0 and the acceleration instruction value X2, and outputs it. In this calculation, the sequence of the limiting process and the calculation of the drive current I may be different from the above-described example.

Figure 4A:
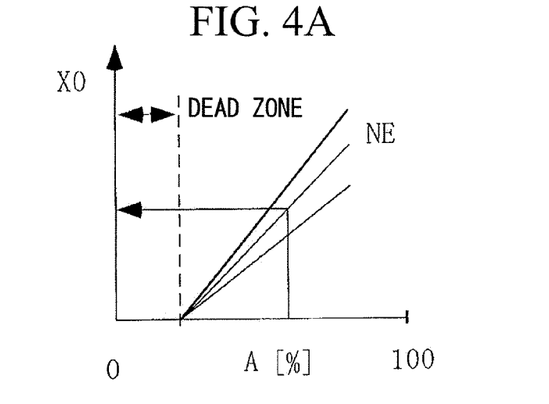
FIG. 4A is an operation explanatory diagram of a steady instruction value arithmetic unit.
Figure 4B:
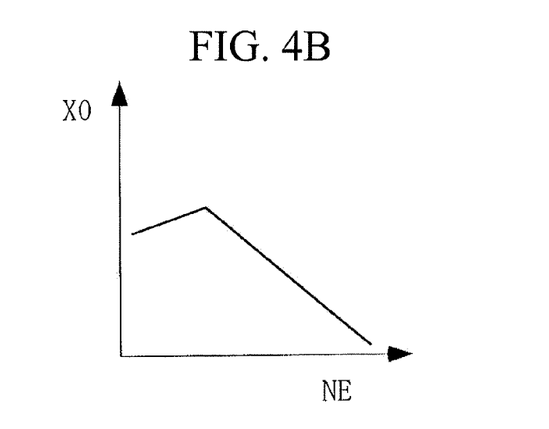
FIG. 4B is an operation explanatory diagram of the steady instruction value arithmetic unit.
Figure 4C:
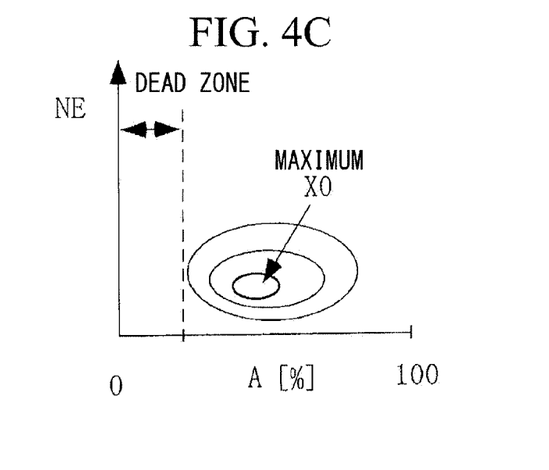
FIG. 4C is an operation explanatory diagram of the steady instruction value arithmetic unit.

FIGS. 4A to 4C are operation explanatory diagrams of the steady instruction value arithmetic unit 22.

FIG. 4A is a schematic diagram showing the relationship between the accelerator opening degree A (horizontal axis) and the steady instruction value X0 (vertical axis). The steady instruction value X0 is the torque instruction value or the speed instruction value.

As shown in this diagram, the steady instruction value arithmetic unit 22 has a dead zone at the completely closed position and the vicinity thereof (near 0) in the accelerator opening degree A. The range of the dead zone is, for example, 0 to 20%. Therefore, even if the accelerator opening degree A is changed in the range of the dead zone, the steady instruction value X0 is 0.

If the steady instruction value X0 is the torque instruction value, corresponding to a case where the torque instruction value is 0, the drive current I of the electric motor 14 is 0.

If the steady instruction value X0 is the speed instruction value, the drive current arithmetic unit 26 compares the speed instruction value and the turbocharger rotational speed NT, and when the speed instruction value is lower than the turbocharger rotational speed NT, the drive current I of the electric motor 14 is set to 0.

Consequently, even if the steady instruction value X0 is the torque instruction value or the speed instruction value, the drive current I is 0 in the range of the dead zone, and the electric motor 14 rotates freely without resistance. As a result, malfunctions or unnecessary power consumption of the electric motor 14 are prevented.

When the accelerator opening degree A is away from the dead zone, the steady instruction value arithmetic unit 22 outputs the steady instruction value X0 corresponding to the engine rotational speed NE. In this case, as shown in FIG. 4A, the steady instruction value X0 becomes a greater value as the accelerator opening degree A increases.

In addition, the engine rotational speed NE and the turbocharger rotational speed NT are not constant, and are changed over time. Therefore, even when the accelerator opening degree A is constant, the steady instruction value X0 required for the steady operation of the turbocharger 12 in the accelerator opening degree A is also changed over time.

FIG. 4B is a schematic diagram showing the relationship between the engine rotational speed NE (horizontal axis) and the steady instruction value X0 (vertical axis).

When the engine rotational speed NE is high, the amount of exhaust gas is large, and the turbocharger 12 rotates at a high speed. Therefore, as shown in this diagram, particularly, in a range in which the engine rotational speed NE is high, the steady instruction value X0 becomes a smaller value as the engine rotational speed NE becomes higher.

Consequently, when the engine rotational speed NE becomes higher and the steady instruction value X0 becomes smaller, the drive current I of the electric motor 14 becomes smaller, and unnecessary power consumption is prevented.

In addition, as shown in FIG. 4B, in operation of the vehicle, in a range in which the engine rotational speed NE is low, the engine rotational speed NE does not become maximum when the engine rotational speed NE is 0, and the steady instruction value X0 is further increased as the engine rotational speed NE increases from 0.

FIG. 4C is a schematic diagram showing the relationship between the accelerator opening degree A (horizontal axis) and the engine rotational speed NE (vertical axis).

As shown in this diagram, when the accelerator opening degree A is great relatively and the engine rotational speed NE is low, the steady instruction value X0 is maximized.

For example, in the example shown in FIG. 4C, the steady instruction value X0 is maximized in a range in which the effective rotational speed of the engine is lower than or equal to 50% of the maximum thereof.

The calculation of the steady instruction value X0 by the steady instruction value arithmetic unit 22 may be performed using the map schematically shown in FIG. 4C, or may be performed using calculating formulas set beforehand.

Figure 5A:
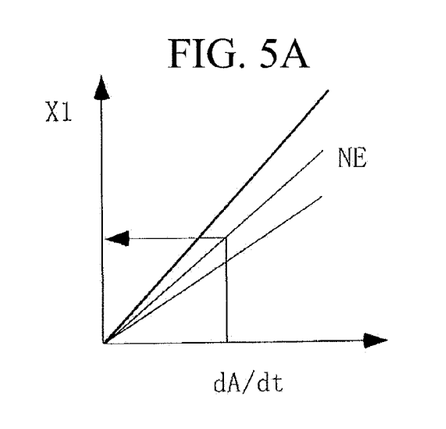
FIG. 5A is an operation explanatory diagram of an acceleration instruction value arithmetic unit.
Figure 5B:
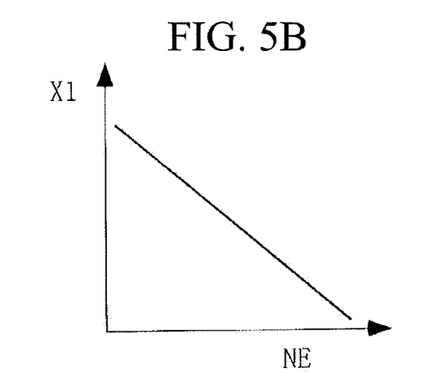
FIG. 5B is an operation explanatory diagram of the acceleration instruction value arithmetic unit.
Figure 5C:
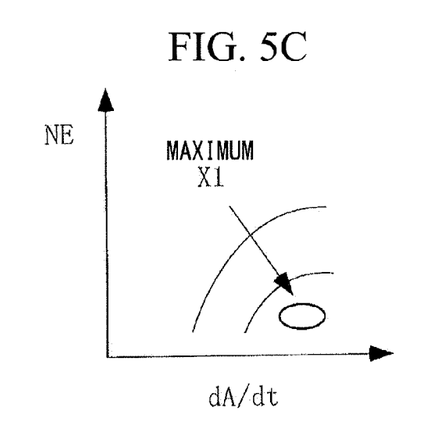
FIG. 5C is an operation explanatory diagram of the acceleration instruction value arithmetic unit.

FIGS. 5A to 5C are operation explanatory diagrams of the acceleration instruction value arithmetic unit 24.

FIG. 5A is a schematic diagram showing the relationship between the accelerator opening degree change rate dA/dt (horizontal axis) and the acceleration instruction value X1 (vertical axis). The acceleration instruction value X1 is the torque instruction value or the speed instruction value.

As shown in this diagram, the acceleration instruction value arithmetic unit 24 has no dead zone with respect to the accelerator opening degree change rate dA/dt, and outputs the acceleration instruction value X1 corresponding to the accelerator opening degree change rate dA/dt, even in the vicinity (near 0) of the completely closed position in the accelerator opening degree A. That is, in this example, the acceleration instruction value X1 becomes a greater value as the accelerator opening degree change rate dA/dt increases.

Consequently, when the drive force generated from the turbine 12a is small, the electric motor 14 adds drive force thereto (power assist), and thereby the acceleration time of the turbocharger 12 can be shortened significantly. As a result, the turbo lag can be removed efficiently.

The acceleration instruction value arithmetic unit 24 outputs the acceleration instruction value X1 corresponding to the engine rotational speed NE.

In addition, the engine rotational speed NE and the turbocharger rotational speed NT are not constant, and are changed over time. Therefore, even when the accelerator opening degree change rate dA/dt is constant, the acceleration instruction value X1 required for the acceleration operation of the turbocharger 12 in the accelerator opening degree change rate dA/dt is also changed over time.

FIG. 5B is a schematic diagram showing the relationship between the engine rotational speed NE (horizontal axis) and the acceleration instruction value X1 (vertical axis).

When the engine rotational speed NE is high, the amount of exhaust gas is large, and the turbocharger 12 rotates at a high speed. Therefore, as shown in this diagram, the acceleration instruction value X1 becomes a smaller value as the engine rotational speed NE becomes higher.

Consequently, when the engine rotational speed NE becomes higher, the acceleration instruction value X1 becomes smaller. As a result, the drive current I of the electric motor 14 becomes small, and unnecessary power consumption is prevented.

FIG. 5C is a schematic diagram showing the relationship between the accelerator opening degree change rate dA/dt (horizontal axis) and the engine rotational speed NE (vertical axis).

As shown in this diagram, when the accelerator opening degree change rate dA/dt is great and the engine rotational speed NE is low, the acceleration instruction value X1 is maximized.

The calculation of the acceleration instruction value X1 by the acceleration instruction value arithmetic unit 24 may be performed using the map schematically shown in FIG. 5C, or may be performed using calculating formulas set beforehand.

Hereinafter, a conventional power-assisted supercharger which does not include the acceleration instruction value arithmetic unit 24 in these embodiments described above is referred to as a conventional example.

FIGS. 6A to 6H are operation explanatory diagrams of the power-assisted supercharger.

Figure 6A:
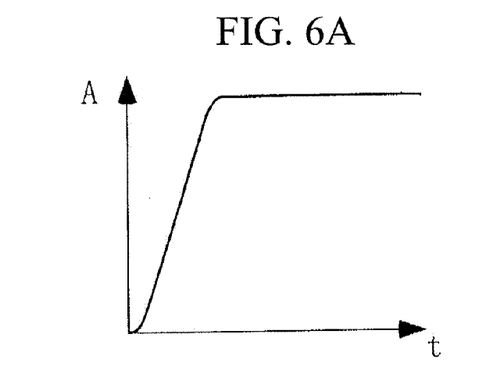
FIG. 6A is an operation explanatory diagram of the power-assisted supercharger.

FIG. 6A is a schematic diagram showing the relationship between the time t in acceleration (horizontal axis) and the accelerator opening degree A (vertical axis). The condition shown in FIG. 6A is applied to the conventional example and the present invention.

Figure 6B:
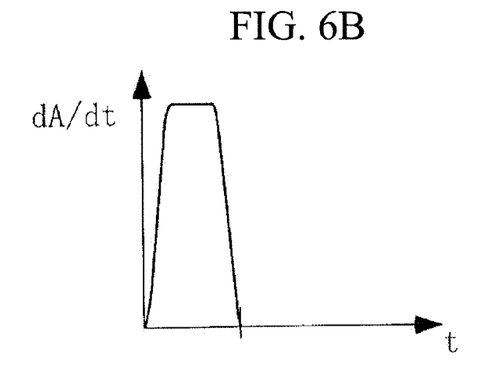
FIG. 6B is an operation explanatory diagram of the power-assisted supercharger.

FIG. 6B is a schematic diagram showing the accelerator opening degree change rate dA/dt corresponding to FIG. 6A. The calculation process in FIG. 6B is performed in only the present invention.

Figure 6C:
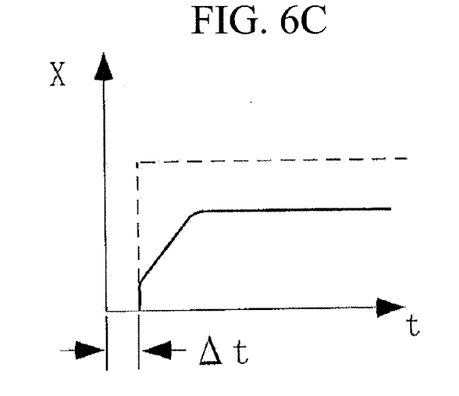
FIG. 6C is an operation explanatory diagram of the power-assisted supercharger.

FIG. 6C is a schematic diagram showing the relationship between the time t in the conventional example (horizontal axis) and the output instruction value X (vertical axis). In this diagram, a broken line denotes a set value of the limiter 27b, and in this example, the output instruction value X is lower than the set value of the limiter 27b. In addition, in the conventional example, there is a time lag Δt from the start of acceleration (t=0), to the start of rise of the output instruction value X (shown by a solid line). The time lag Δt is, for example, 1 to 2 seconds.

Figure 6D:
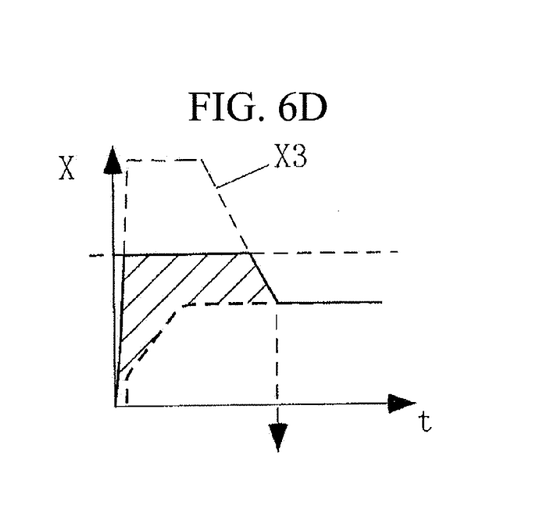
FIG. 6D is an operation explanatory diagram of the power-assisted supercharger.

FIG. 6D is a schematic diagram showing the relationship between the time t in the present invention (horizontal axis) and the output instruction value X (vertical axis). This diagram shows that the acceleration instruction value X2 based on the accelerator opening degree change rate dA/dt in FIG. 6B is added to the characteristic in FIG. 6C, and the limiter 27b performs the limiting process to the combined instruction value X3.

Since the combined instruction value X3 before the limiting process is over the upper limit of the limiter 27b, the combined instruction value X3 is limited by the limiter 27b, to the upper limit thereof. In addition, since the filter 25c has the characteristic of generating a time delay when the acceleration instruction value X1 decreases, the output instruction value X shows a gradually downward line.

The characteristic in FIG. 6D becomes the characteristic obtained by adding the shaded area thereof to the characteristic in FIG. 6C. Therefore, in this diagram, the time lag Δt in FIG. 6C is removed by addition of the shaded area.

Figure 6E:
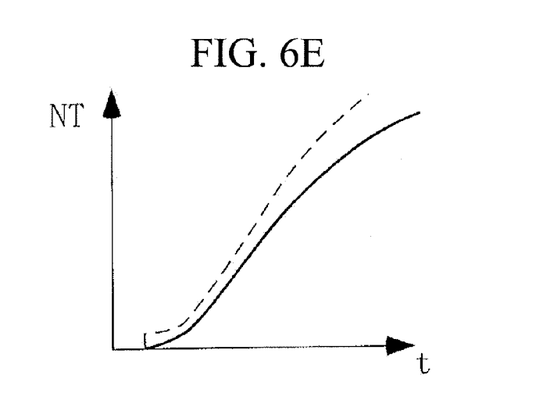
FIG. 6E is an operation explanatory diagram of the power-assisted supercharger.

FIG. 6E is a schematic diagram showing the relationship between the time t in the conventional example (horizontal axis) and the turbocharger rotational speed NT (vertical axis). In this diagram, a broken line denotes the maximum speed corresponding to the set value of the limiter 27b, and a solid line denotes the speed corresponding to the characteristic (shown by a solid line) in FIG. 6C. In addition, in this diagram, the time lag Δt in FIG. 6C directly causes the time lag Δt of the turbocharger rotational speed NT.

Figure 6F:
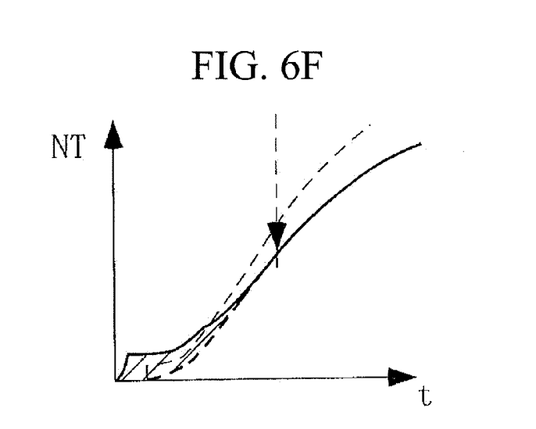
FIG. 6F is an operation explanatory diagram of the power-assisted supercharger.

FIG. 6F is a schematic diagram showing the relationship between the time t in the present invention (horizontal axis) and the turbocharger rotational speed NT (vertical axis). The characteristic in FIG. 6F becomes the characteristic obtained by adding the shaded area thereof to the characteristic in FIG. 6E. Therefore, in this diagram, the time lag Δt in FIG. 6E is removed by addition of the shaded area.

Figure 6G:
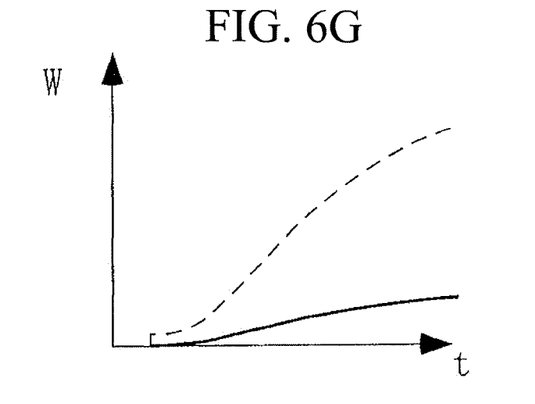
FIG. 6G is an operation explanatory diagram of the power-assisted supercharger.

FIG. 6G is a schematic diagram showing the relationship between the time t in the conventional example (horizontal axis) and the power consumption W in the electric motor 14 (vertical axis). In this diagram, a broken line denotes the power consumption corresponding to the set value of the limiter 27b, and a solid line denotes the power consumption corresponding to the characteristic (shown by a solid line) in FIG. 6C.

In this diagram, the time lag Δt in FIG. 6C directly causes the time lag Δt of the turbocharger rotational speed NT. Therefore, even though the power consumption W is increased so as to be shown by the broken line, it is found that the time lag cannot be removed.

Figure 6H:
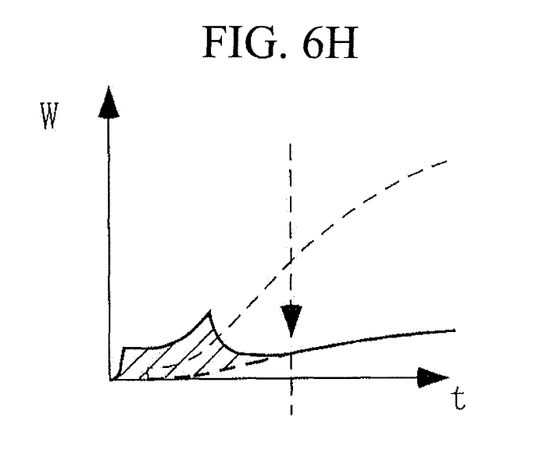
FIG. 6H is an operation explanatory diagram of the power-assisted supercharger.

FIG. 6H is a schematic diagram showing the relationship between the time in the present invention (horizontal axis) and the power consumption W in the electric motor 14 (vertical axis). In this diagram, a broken line denotes the power consumption corresponding to the set value of the limiter 27b, and a solid line denotes the characteristic obtained by adding the shaded area thereof to the characteristic (shown by a solid line) in FIG. 6G.

According to this diagram, the time lag Δt of the turbocharger rotational speed NT can be removed by only adding the power consumption corresponding to the shaded area.

In the power-assisted supercharger 10 in the present invention described above, if necessary, a transformer unit may be provided between the power supply and the motor controller 20, depending on the voltage supplied from the vehicle including the engine.

According to the embodiments in the present invention described above, the electric motor 14 is provided in order to add rotational force to the rotary shaft 12c of the turbocharger 12, and the electric motor 14 adds the drive force thereto (power assist) when the drive force generated from the turbine 12a is small. Therefore, the acceleration time of the turbocharger 12 can be shortened significantly.

In the control of the power assist, since the torque instruction value or the speed instruction value of the electric motor 14 is controlled by open loop, and feedback control is not performed, the control system is simplified. As a result, it becomes possible to independently operate the power-assisted supercharger by only receiving a few control signals (engine rotational speed, turbocharger rotational speed, and accelerator opening degree) from the vehicle.

The present invention is not limited to the above-described embodiments, and various modifications can be adopted within the scope not departing from the gist of the present invention. That is, a shape, a combination or the like of each component shown in the above-described embodiments is illustrative only, and additions, omissions, substitutions, or other modifications to the configuration can be performed within the scope not departing from the gist of the present invention. The present invention is not limited to the above-described description, and is limited to only the scope of the attached claims.

INDUSTRIAL APPLICABILITY

According to the present invention, a power-assisted supercharger and a method of controlling the supercharger can be provided, in which the turbo lag can be reduced by itself, the power consumption can be small even in a range in which the engine rotational speed is high, malfunctions or unnecessary power consumption can be prevented, the control system can be simplified, and the installation space and the weight thereof can be small.

DESCRIPTION OF REFERENCE SIGNS

5 Intake air (air)
7 Exhaust gas
10 Power-assisted supercharger
12 Turbocharger
12a Turbine
12b Compressor
12c Rotary shaft
14 Electric motor
20 Motor controller
22 Steady instruction value arithmetic unit
24 Acceleration instruction value arithmetic unit
25a Accelerator opening degree change rate arithmetic device
25b Acceleration instruction value arithmetic device
25c Filter
26 Drive current arithmetic unit
27a Adder
27b Limiter
27c Motor driver
40 Engine

The invention claimed is:

1. A power-assisted supercharger comprising:
a turbocharger in which a turbine is rotationally driven by exhaust gas from an engine, a compressor rotationally driven by the turbine compresses intake air and supplies the intake air to the engine;
an electric motor connected to a rotary shaft connecting the turbine and the compressor, and the electric motor to add rotational force to the turbocharger; and
a motor controller to control a drive current to the electric motor required for an assist operation for the turbocharger, by open loop, based on an accelerator opening degree of the engine and a rotational speed of the engine,
wherein the motor controller is configured to:
calculate a steady instruction value required for a steady operation of the turbocharger, from the accelerator opening degree of the engine;
calculate an accelerator opening degree change rate;
calculate an acceleration instruction value required to an acceleration operation of the turbocharger, from the accelerator opening degree change rate of the engine; and
calculate the drive current to the electric motor, from the steady instruction value and the acceleration instruction value, and output the drive current,
wherein when calculating the drive current to the electric motor, the motor controller is configured to:
calculate a combined instruction value by adding the steady instruction value and the acceleration instruction value;
generate an output instruction value by limiting the combined instruction value to an upper limit thereof or less; and
calculate the drive current to the electric motor based on the output instruction value, and output the drive current.

2. The power-assisted supercharger according to claim 1, wherein the steady instruction value has a dead zone at a completely closed position and a vicinity thereof in the accelerator opening degree.

3. The power-assisted supercharger according to claim 1, wherein the steady instruction value and the acceleration instruction value become smaller values as the rotational speed of the engine becomes higher.

4. The power-assisted supercharger according to claim 1, wherein when calculating the acceleration instruction value, the motor controller is configured to:
calculate a torque instruction value or a speed instruction value as the acceleration instruction value required for the acceleration operation of the turbocharger, based on the accelerator opening degree change rate; and
perform a filtering process to the acceleration instruction value.

5. The power-assisted supercharger according to claim 4, wherein the filtering process generates a time delay when the acceleration instruction value decreases.

* * * * *